United States Patent
Kozman et al.

(10) Patent No.: US 7,921,988 B2
(45) Date of Patent: Apr. 12, 2011

(54) OVEN DRIVE SYSTEM

(75) Inventors: Austin J. Kozman, Dallas, TX (US);
Robert W. Middleton, Jr., Plano, TX (US); Keith A. Dietz, Allen, TX (US); Jose G. Ramirez, Rio Medina, TX (US)

(73) Assignee: Stewart Systems Global, LLC, Plano, TX (US)

( * ) Notice: Subject to any disclaimer, the term of this patent is extended or adjusted under 35 U.S.C. 154(b) by 120 days.

(21) Appl. No.: 12/237,185

(22) Filed: Sep. 24, 2008

(65) Prior Publication Data

US 2009/0084662 A1 Apr. 2, 2009

Related U.S. Application Data

(60) Provisional application No. 60/975,642, filed on Sep. 27, 2007.

(51) Int. Cl.
*B65G 23/14* (2006.01)
(52) U.S. Cl. .................... 198/833; 198/778; 99/443 C
(58) Field of Classification Search .............. 198/833; 99/360–366, 386, 443 C
See application file for complete search history.

(56) References Cited

U.S. PATENT DOCUMENTS

| | | | | |
|---|---|---|---|---|
| 1,903,488 A | * | 4/1933 | Stibbs | 198/687 |
| 1,948,090 A | * | 2/1934 | Alvey | 198/733 |
| 2,503,771 A | * | 4/1950 | Roll | 99/443 R |
| 3,732,059 A | * | 5/1973 | Goodnight et al. | 431/286 |
| 4,197,092 A | * | 4/1980 | Bretz | 48/86 R |
| 4,233,907 A | * | 11/1980 | Brown et al. | 104/172.3 |
| 4,701,696 A | * | 10/1987 | Bogardus et al. | 324/757 |
| 4,836,358 A | * | 6/1989 | Fauth et al. | 198/789 |
| 4,852,720 A | * | 8/1989 | Roinestad | 198/778 |
| 5,702,245 A | * | 12/1997 | London | 432/14 |
| 5,785,168 A | * | 7/1998 | Beall, Jr. | 198/465.4 |
| 6,170,293 B1 | * | 1/2001 | Cody | 65/168 |
| 7,337,894 B2 | * | 3/2008 | Tabler | 198/465.4 |

* cited by examiner

*Primary Examiner* — Mark A Deuble
(74) *Attorney, Agent, or Firm* — Klemchuk Kubasta LLP

(57) ABSTRACT

An oven drive system for use with commercial bakery ovens comprises a speed reducer and motor external to the bakery oven, a drive shaft extending from within the oven and operatively coupled to the speed reducer and the motor, and conveyor chain driving caterpillar located within the oven and operatively coupled to the draft shaft. The drive shaft is configured for minimal heat transfer to components external to the oven.

7 Claims, 6 Drawing Sheets

OVEN DRIVE SYSTEM

CROSS-REFERENCE TO RELATED APPLICATION

Applicant claims priority based on provisional patent application Ser. No. 60/975,642 filed Sep. 27, 2007, the entire content of which is incorporated herein by reference.

TECHNICAL FIELD

This invention relates generally to drive systems for bakery ovens and more particularly to oven drive assemblies operable inside a commercial bakery oven.

BACKGROUND AND SUMMARY OF THE INVENTION

Modern commercial bakeries of the type utilized in the manufacture of bread, rolls, and similar bakery products employ a large oven enclosure and a conveyor system extending therethrough. Uncooked dough is deposited into bakery pans which are transported by the conveyor through the oven. The speed of operation of the conveyor is coordinated with the length of the conveyor such that the dough is fully baked when a single pass through the oven has been completed.

Heretofore it has not been practical to position conveyor drive assemblies inside the oven because the elevated temperature within the oven would cause the component parts of the conveyor drive assembly to fail. Prior to the present invention oven conveyor chains have been driven by a single conveyor drive assembly located outside of the oven which overcomes the problem of excessive heat but is unsatisfactory because the entire length of the conveyor is pulled through the oven from a single location. This causes excessive load and chain pull on the conveyor chain as well as more stress on the chain bearings. Also, if the single conveyor drive assembly goes down the entire system is down.

The present invention comprises an oven drive system which overcomes the foregoing difficulties which have long since characterized the prior art. In accordance with the broader aspects of the invention oven drive assemblies for a bakery oven comprise a drive motor and a speed reducer located outside of the bakery oven, a drive shaft extending into the oven, and a conveyor chain drive caterpillar located inside the oven. The drive shaft preferably configured for minimal heat transfer through the drive shaft to the components of the oven drive assembly located external to the oven.

All of the components of the conveyor chain drive caterpillar and the drive shaft comprise materials having similar coefficients of thermal expansion such that the components can withstand high temperatures within the oven while minimizing induced thermal stress caused by fluctuation in oven temperature. This facilitates the positioning of oven drive assemblies comprising the invention at substantially equally spaced intervals along the conveyor chain thereby reducing stress on the conveyor chain and maximizing conveyor chain life. Also, failure of one of the oven drive assemblies does not result in the entire system going down as has been the case previously. Rather, the remaining oven drive assemblies compensate for the increased load by operating at elevated stress levels until the failed oven drive assembly can be repaired.

BRIEF DESCRIPTION OF THE DRAWINGS

A more complete understanding of the present invention may be had by reference to the following Detailed Description when taken in connection with the accompanying Drawings, wherein.

DETAILED DESCRIPTION

Figure 1:
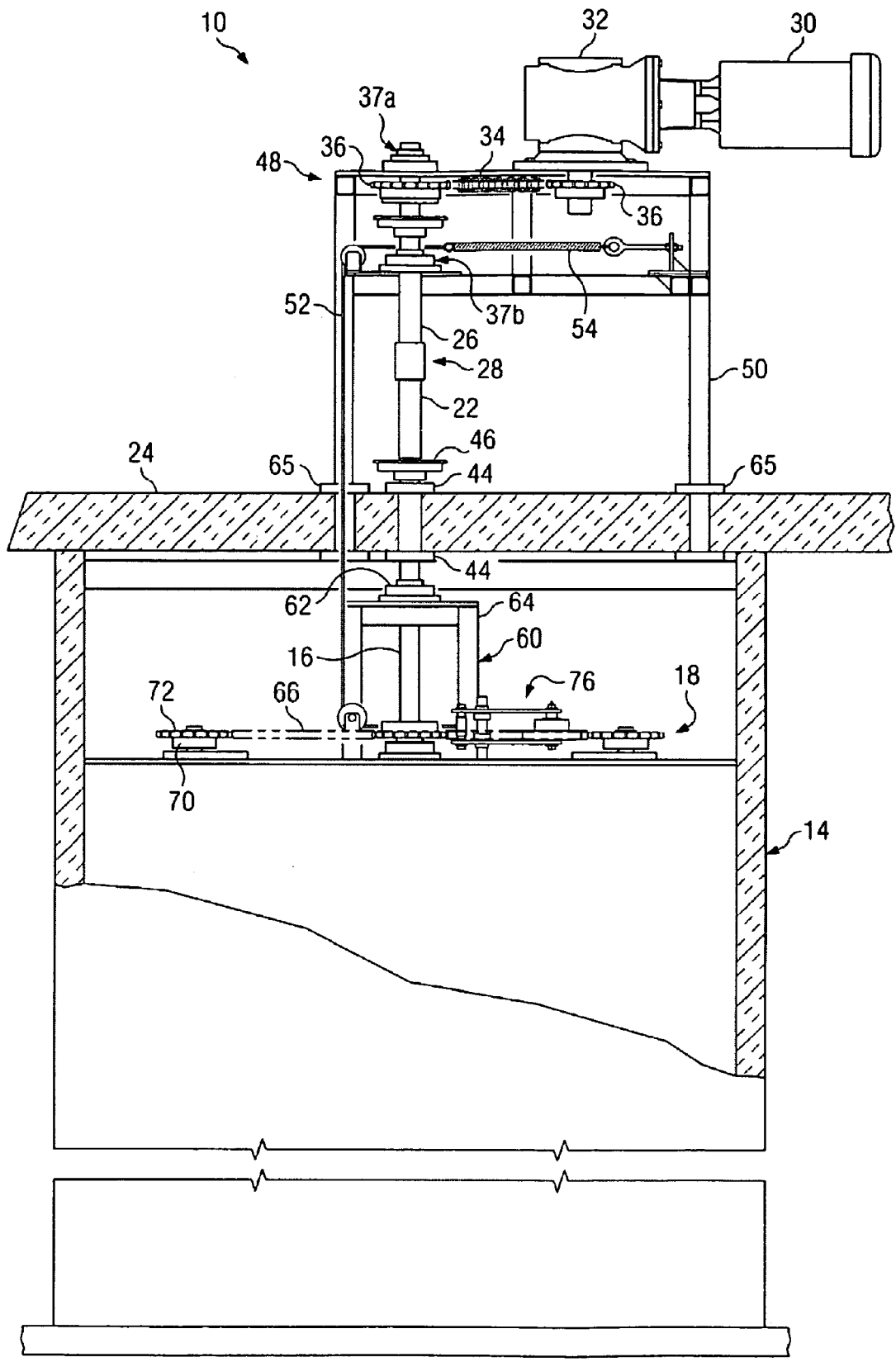
FIG. 1 is a sectional view of an oven drive assembly comprising one embodiment of the present invention.

Referring now to FIG. 1, there is shown an oven drive assembly 10 comprising the present invention. The oven drive assembly 10 comprises a drive shaft 16 coupled to a conveyor chain drive caterpillar 18 which drives a conveyor chain inside the oven 14. The drive shaft 16 includes a first segment 22 coupled at one end thereof to the caterpillar 18 and extending therefrom upwardly through an insulated exterior wall 24 of the oven 14.

Outside the oven 14 the first segment 22 of the drive shaft 16 is coupled to a second segment 26 by a heat dissipating coupler 28. The first segment 22 of the drive shaft 16 may be provided with high thermal conductivity tinned heat exchangers, and forced connective cooling across the shaft can be provided by means of a fan or by means of a temperature controlled enclosure. The second segment 26 is operatively connected to a motor 30 and speed reducer 32 by a drive chain 34 and sprockets 36. The upper end of the second segment 26 and therefore the entire drive shaft 16 is supported by bearings 37a and 37b. Bearing 37a is a tapered roller bearing or equivalent which supports the weight of the drive shaft 16. The bearing 37b allows for expansion of the second segment 26.

During operation of the oven 14 the first segment 22 of the drive shaft 16 is at or near the operating temperature of the oven 14 while the second segment 26 is at or near ambient temperature of the bakery. All components of the drive plate assembly 18 and drive shaft 16 comprise materials having similar coefficients of thermal expansion such that the components can withstand high temperatures within the oven 14 while minimizing induced thermal stress caused by temperature fluctuations.

Figure 1A:
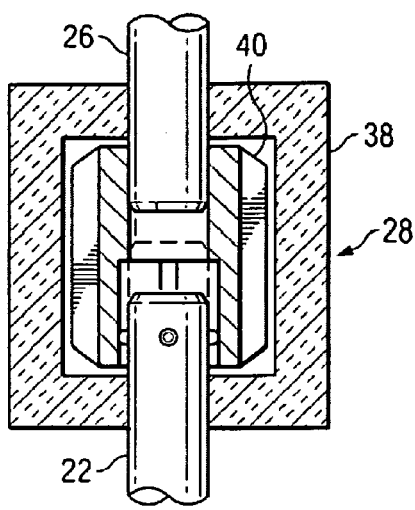
FIG. 1A is sectional view of one component of the oven drive assembly shown in FIG. 1.

FIG. 1A comprises a sectional view of the coupler 28 which connects the first segment 22 with the second segment 26. Each coupler 28 may be enclosed in an insulated enclosure 38 and may comprise a disk 40 having an upper surface and a lower surface. The lower surface is slotted and secured with hexagonal setscrews thereby enabling expansion and contraction of the first segment as temperatures within the oven 14 fluctuate. Alternatively, the coupler 28 may comprise a bellows-type coupling, a gear coupling, or other coupling types known in the art for minimizing heat transfer.

Referring again to FIG. 1, sealing gaskets 44 are supported above and below the exterior wall 24 of the oven 14 to minimize volatile organic compounds (VOC), heat loss, product of combustion, and gas leaks from within the oven 14. Seated above the upper sealing gasket 44 and positioned about the first segment of the drive shaft is one of two or more mechanical shaft coolers 46 comprising the drive shaft 16. The oven drive assembly 10 is supported by a support and stabilization structure 48 comprising a frame 50, a tension wire 52 and a tension spring 54 mounted above the oven 14.

Figure 2:
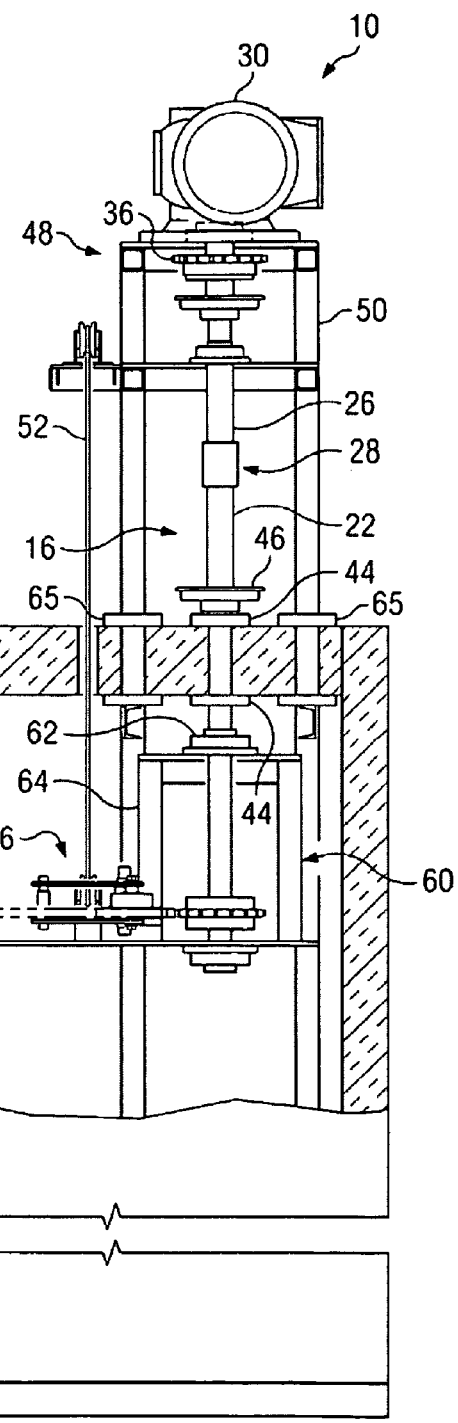
FIG. 2 is a side view of the oven drive assembly shown in FIG. 1.

FIG. 2 is a side view of the oven drive assembly 10 shown in FIG. 1. The caterpillar 18 is supported within the oven 14 by a support tower 60. The location of caterpillar(s) 18 within the oven 14 may vary and is determined according to load analysis of the conveyor in order to achieve an optimal location between all load points of the conveyor. Located above the support tower 60 is an expansion bearing 62 supported by a frame 64. The expansion bearing 62 surrounds the first segment 22 and accordingly allows movement thereabout as the first segment 22 of the drive shaft 16 expands due to increased oven temperature. The frame components located inside the oven 14 are thermally decoupled from the frame components located outside the oven by ceramic insert pads 65.

Figure 3:
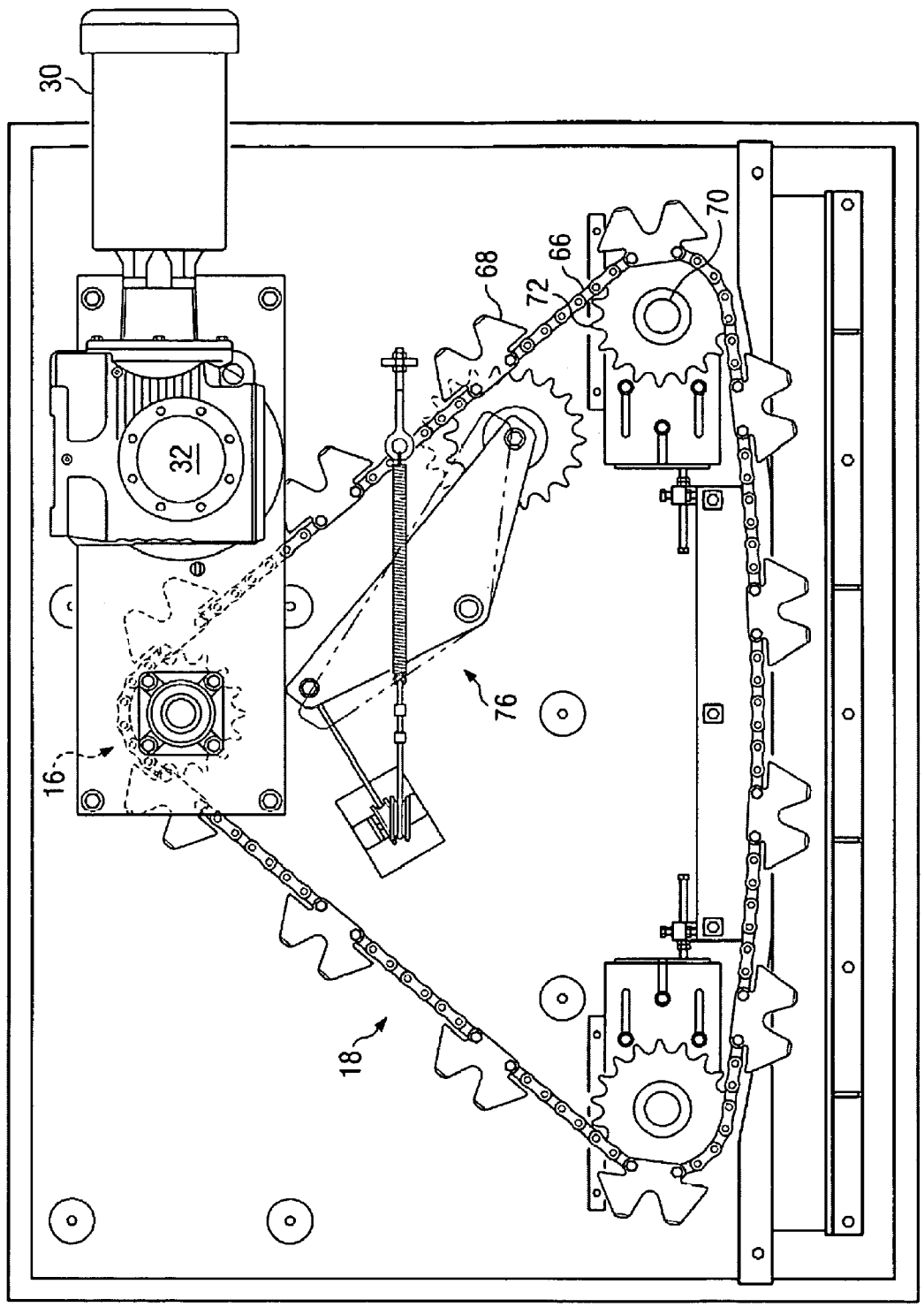
FIG. 3 is a top view of a component of the oven drive assembly shown in FIG. 1.
Figure 4:
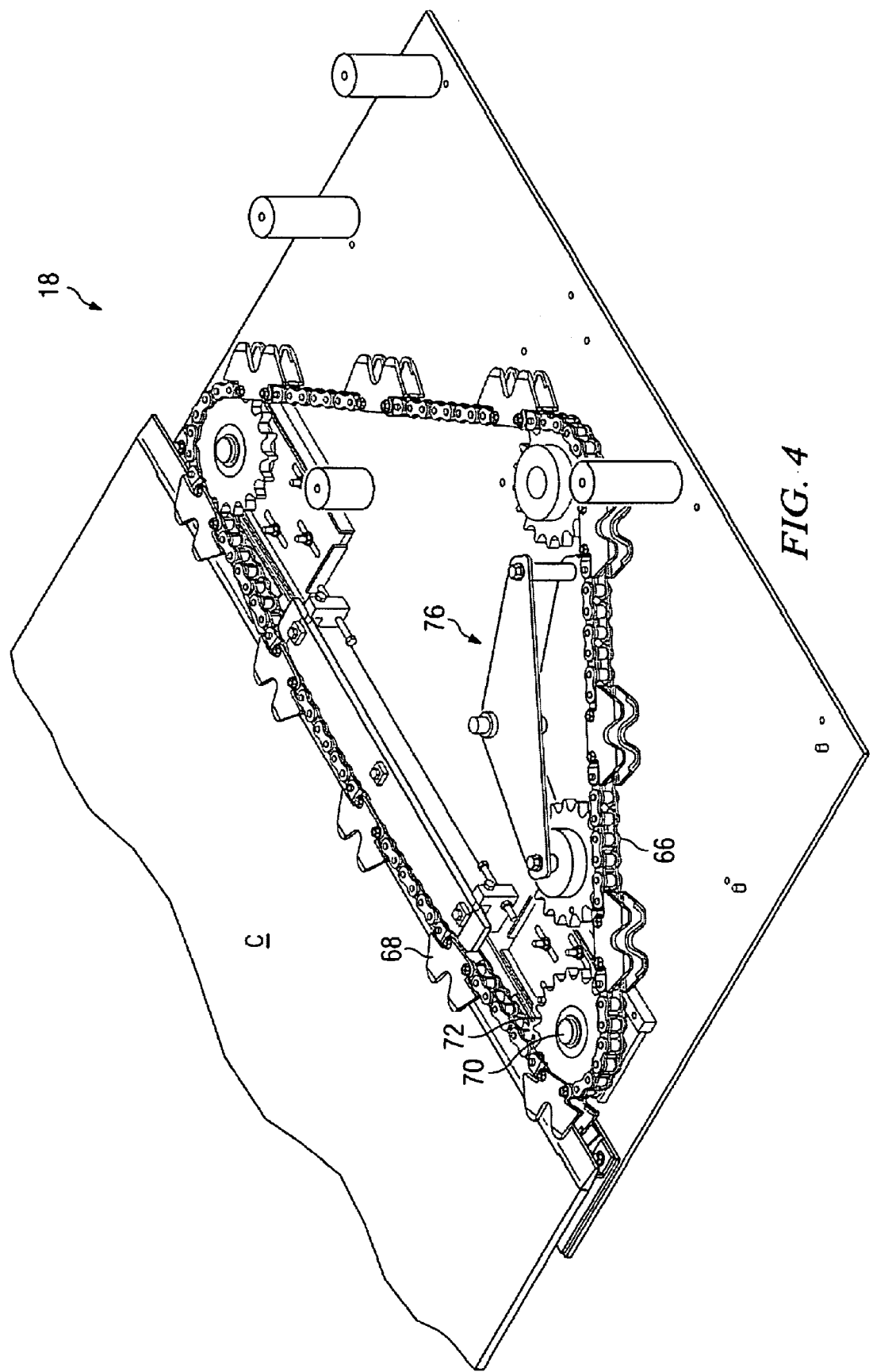
FIG. 4 is a perspective view of the component of the oven drive assembly shown in FIG. 3.

FIGS. 3 and 4 comprise top and perspective views of the caterpillar 18, respectively. The caterpillar 18 comprises a chain 66 having conveyor engaging teeth 68 mounted thereon at equally spaced intervals. The chain 66 may be provided with an automatic lubrication system, if desired. The chain 66 is supported on and rotates about a plurality of bearings 70 and sprockets 72. A tensioner 76 maintains proper tension in the chain 66 for constant engagement between the teeth 68 and conveyor chain C even as the chain 66 expands and contracts due to temperature fluctuation within the oven 14. Although a particular type of tensioner 16 is shown in the drawings, those skilled in the art will know and understand that other types of tensioners can be used in the making of the invention.

The expansion bearing 62 and bearings 70 of the caterpillar 18 may comprise sealed hybrid bearings, all steel bearings, or all ceramic bearings capable of withstanding substantially high temperatures and comprising lubricants and other components known in the art to be capable of withstanding substantially high temperatures. The component parts of the oven drive assembly 10 that are located inside the oven 14 are preferably selected from among the materials described in U.S. Pat. Nos. 6,968,943 and 7,086,525 the entire contents of which are incorporated herein by reference as if fully set forth herein.

Figure 5:
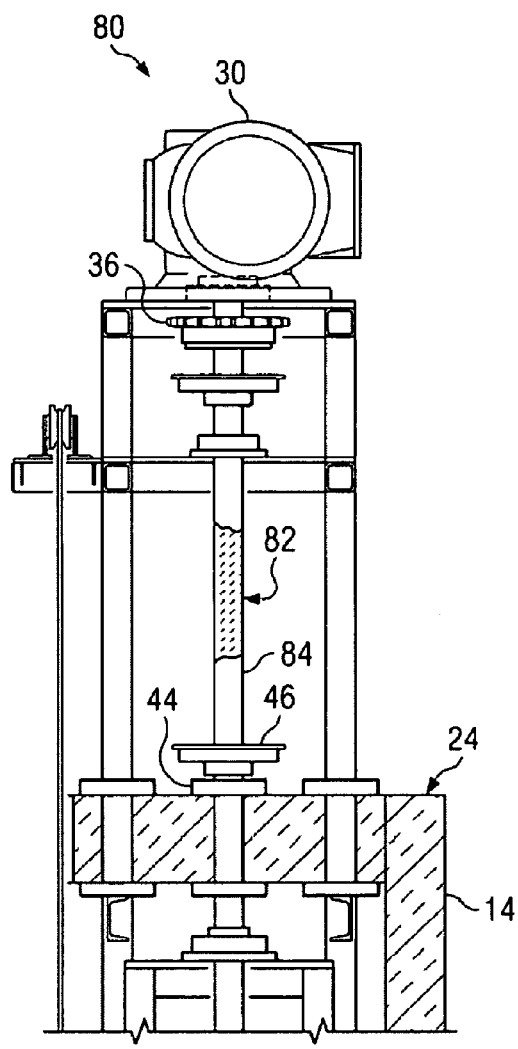
FIG. 5 is side sectional view of an oven drive assembly comprising another embodiment of the present invention.

Referring now to FIG. 5 there is shown an oven drive system 80 comprising an alternative embodiment of a self-cooling drive shaft 82. The drive shaft 82 comprises one continuous cylinder 84 coupled at one end to the caterpillar 18 and at an opposite end to the speed reducer 32 and the motor 30. The drive shaft 82 preferably comprises a material known in the art as capable of tolerating high temperatures such as those generated in the oven 14 while not transferring heat to the components external to the oven 14. For example, the drive shaft 82 may comprise a ceramic material or other material known for its low thermal conductivity characteristics. The drive shaft 82 can also be hollow and constructed as a heat pipe or as a conduit which circulates coolant in a closed loop system.

Figure 6:
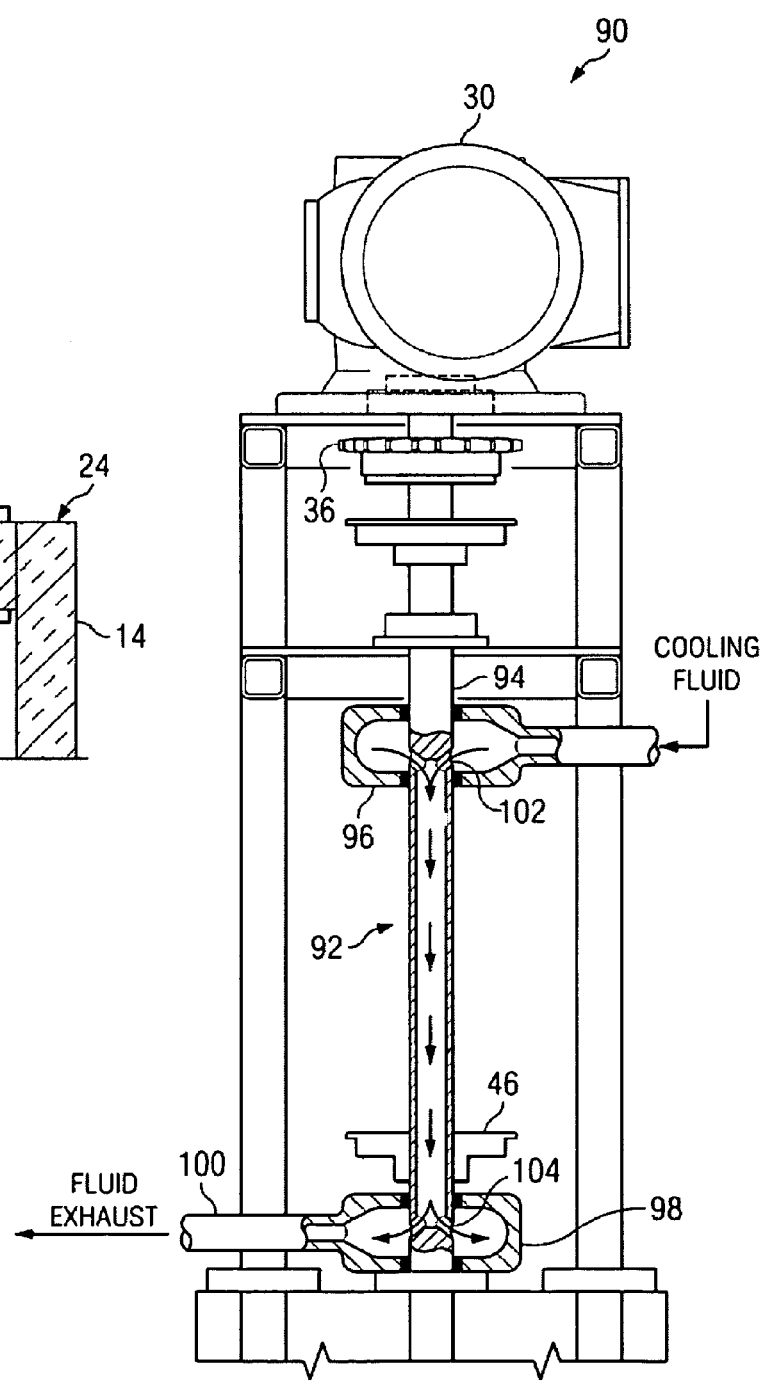
FIG. 6 is a side sectional view of an oven drive assembly comprising yet another embodiment of the present invention.

Referring now to FIG. 6 there is shown an oven drive system 90 comprising a self-cooling drive shaft 92. The drive shaft comprises one continuous cylinder 94 coupled at one end with the caterpillar 18 and at an opposite end with the speed reducer 32 and motor 30. Positioned between the shaft coolers 46 are a fluid intake collar 96 and a fluid drain 98 and exhaust 100. Cooling fluid is inserted into receiving orifices 102 in the cylinder 94 and runs down through the cylinder 94 thereby cooling the drive shaft 92. The cooling fluid is discharged through venting orifices 104 in the cylinder 94 and fluid drain 98 and exhaust 100. Alternatively, the drive shaft 92 can be vacuum sealed and provided with a small amount of fluid to act as a heat pipe.

Figure 7:
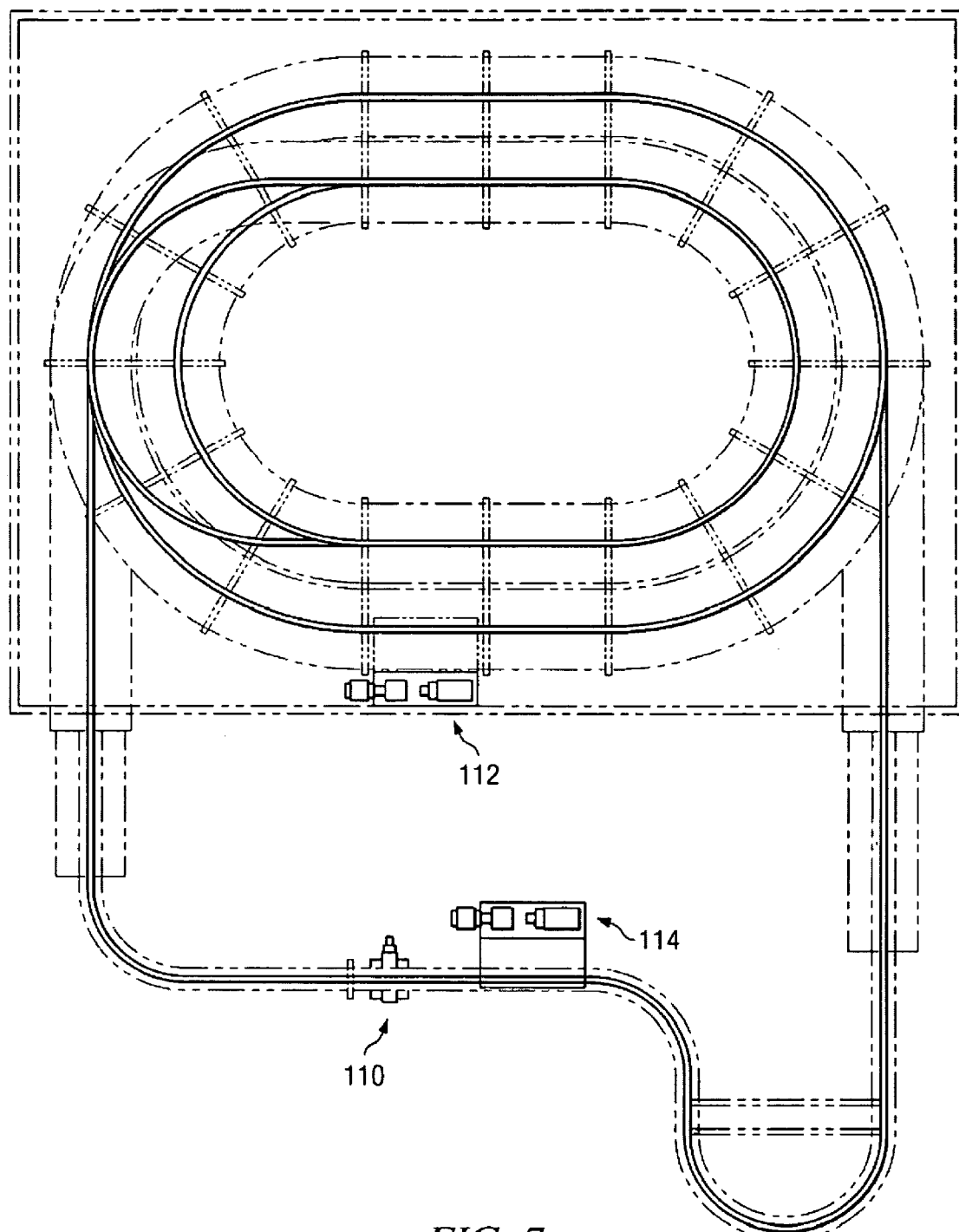
FIG. 7 is a plan view of a bakery oven incorporating the present invention.

FIG. 7 comprises a plan view of a commercial bakery oven 110 incorporating the present invention. The oven 110 includes two oven drive assemblies 112 and 114 each comprising the present invention.

Although preferred embodiments of the invention have been illustrated in the accompanying Drawings and described in the foregoing Detailed Description, it will be understood that the invention is not limited to the embodiments disclosed, but is capable of numerous rearrangements, modifications, and substitutions of parts and elements without departing from the spirit of the invention.

The invention claimed is:

1. An oven conveyor chain drive system for use with a bakery oven comprising:
   a caterpillar supported within the oven for operatively engaging a bakery conveyor chain extending therethrough;
   a drive shaft operatively coupled to the caterpillar;
   a speed reducer external to the bakery oven operatively coupled to the drive shaft; and
   a motor external to the bakery oven operatively coupled to the speed reducer;
   wherein the drive shaft comprises one continuous segment constructed from a ceramic material.

2. The system according to claim 1 wherein the drive shaft comprises means for directing cooling fluid therethrough.

3. An oven drive system comprising:
   an oven having an interior for baking therein and an exterior for housing the oven drive system, the oven comprising a passageway between the interior and exterior thereof;
   a caterpillar positioned within the interior of the oven for operatively engaging a bakery conveyor chain;
   a drive shaft having a first and second end, the drive shaft operatively coupled to the caterpillar at the first end thereof at a position within the interior of the oven wherein the drive shaft extends from the interior of the oven through the passageway to the exterior thereof;
   a speed reducer operatively coupled to the second end of the drive shaft positioned at the exterior of the oven; and
   a motor operatively coupled to the speed reducer positioned at the exterior of the oven
   wherein the drive shaft is self-cooling; and
   wherein the self-cooling drive shaft comprises one continuous cylinder, the cylinder constructed of a ceramic material.

4. The system according to claim 3 wherein the self-cooling drive shaft comprises a fluid intake collar for receiving cooling fluid therein.

5. The system according to claim 4 wherein the self-cooling drive shaft comprises a fluid drain for discharging the fluid received from the fluid intake collar.

6. An oven drive system comprising:
   an oven having an interior for baking therein and an exterior for housing the oven drive system, the oven comprising a passageway between the interior and exterior thereof;
   a caterpillar positioned within the interior of the oven for operatively engaging a bakery conveyor chain;
   a drive shaft having a first and second end, the drive shaft operatively coupled to the caterpillar at the first end thereof at a position within the interior of the oven wherein the drive shaft extends from the interior of the oven through the passageway to the exterior thereof;

a speed reducer operatively coupled to the second end of the drive shaft positioned at the exterior of the oven; and a motor operatively coupled to the speed reducer positioned at the exterior of the Oven;

wherein the drive shaft is self-cooling; and wherein the drive shaft comprises a small amount of fluid and is vacuum sealed, thereby acting as a heat pipe.

7. An oven drive system comprising:

an oven having an interior for baking therein and an exterior for housing the oven drive system, the oven comprising a passageway between the interior and exterior thereof;

a caterpillar positioned within the interior of the oven for operatively engaging a bakery conveyor chain;

a drive shaft having a first and second end, the drive shaft operatively coupled to the caterpillar at the first end thereof at a position within the interior of the oven wherein the drive shaft extends from the interior of the oven through the passageway to the exterior thereof;

a speed reducer operatively coupled to the second end of the drive shaft positioned at the exterior of the oven; and a motor operatively coupled to the speed reducer positioned at the exterior of the oven;

wherein the drive shaft comprises a first and second segment, the first segment extending into the interior of the oven;

further comprising an insulating coupler connecting the first segment of the drive shaft to the second segment of the drive shaft; and wherein the insulating coupler comprises a means for enabling expansion and contraction of the first segment of the drive shaft.

* * * * *